United States Patent
Fouda et al.

(10) Patent No.: US 10,344,587 B2
(45) Date of Patent: Jul. 9, 2019

(54) DETECTING SLIDING SLEEVE POSITION USING ELECTRODE-TYPE LOGGING

(71) Applicant: Halliburton Energy Services, Inc., Houston, TX (US)

(72) Inventors: Ahmed E. Fouda, Houston, TX (US); Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/502,854

(22) PCT Filed: Oct. 7, 2015

(86) PCT No.: PCT/US2015/054493
§ 371 (c)(1),
(2) Date: Feb. 9, 2017

(87) PCT Pub. No.: WO2017/062001
PCT Pub. Date: Apr. 13, 2017

(65) Prior Publication Data
US 2018/0202284 A1     Jul. 19, 2018

(51) Int. Cl.
| | | |
|---|---|---|
| *E21B 47/09* | (2012.01) | |
| *E21B 47/12* | (2012.01) | |
| *G01V 3/26* | (2006.01) | |
| *G01V 3/38* | (2006.01) | |
| *E21B 34/00* | (2006.01) | |
| *G01V 3/30* | (2006.01) | |

(52) U.S. Cl.
CPC .......... *E21B 47/0905* (2013.01); *E21B 47/09* (2013.01); *E21B 47/12* (2013.01); *G01V 3/26* (2013.01); *G01V 3/38* (2013.01); *E21B 2034/007* (2013.01); *G01V 3/30* (2013.01)

(58) Field of Classification Search
CPC ...... E21B 47/09; E21B 47/12; E21B 47/0905; E21B 2034/007
See application file for complete search history.

(56) References Cited

U.S. PATENT DOCUMENTS

| | | |
|---|---|---|
| 5,691,813 A | 11/1997 | Wood |
| 7,000,698 B2 | 2/2006 | Mayeu et al. |
| 7,810,564 B2 | 10/2010 | Montgomery et al. |
| 2003/0127232 A1 | 7/2003 | Bussear et al. |

(Continued)

FOREIGN PATENT DOCUMENTS

| | | |
|---|---|---|
| WO | WO 2011/051435 A2 | 5/2011 |
| WO | WO 2014/105080 A1 | 7/2014 |
| WO | WO 2015/099765 A1 | 7/2015 |

OTHER PUBLICATIONS

Partial Supplementary Search Report issued for European Patent Application No. 15905943.5, dated Jul. 30, 2018, 15 pages.

(Continued)

*Primary Examiner* — David Carroll
(74) *Attorney, Agent, or Firm* — Haynes and Boone, LLP

(57) ABSTRACT

The operational position of a sliding sleeve is detected using an electrode-type logging tool. The logging tool generates a baseline log of the sliding sleeve in a non-actuated position, and a response log of the sliding sleeve in an actuated position. The baseline and response logs are then compared in order to determine the operational position of the sliding sleeve.

24 Claims, 6 Drawing Sheets

(56) References Cited

U.S. PATENT DOCUMENTS

| | | | |
|---|---|---|---|
| 2004/0163809 A1 | 8/2004 | Mayeu et al. | |
| 2004/0194958 A1 | 10/2004 | Mayeu et al. | |
| 2008/0236819 A1 | 10/2008 | Foster et al. | |
| 2009/0120637 A1 | 5/2009 | Kirkwood et al. | |
| 2010/0044108 A1* | 2/2010 | Bespalov | E21B 47/022 175/24 |
| 2010/0109906 A1* | 5/2010 | Montgomery | E21B 34/14 340/853.2 |
| 2011/0185806 A1* | 8/2011 | Pfutzner | G01V 7/06 73/152.54 |
| 2011/0260715 A1 | 10/2011 | Frost et al. | |
| 2014/0239959 A1* | 8/2014 | Clarkson | G01V 3/10 324/338 |
| 2015/0176369 A1 | 6/2015 | Nguyen et al. | |
| 2015/0260013 A1* | 9/2015 | Booker | E21B 34/066 166/250.01 |
| 2016/0208579 A1* | 7/2016 | Delzell | E21B 33/12 |

OTHER PUBLICATIONS

International Search Report and The Written Opinion of the International Search Authority, or the Declaration, Jul. 4, 2016, PCT/US2015/054493, 21 pages, ISA/KR.
Extended Search Report issued for European Patent Application No. 15905943.5, dated Oct. 30, 2018, 15 pages.

\* cited by examiner

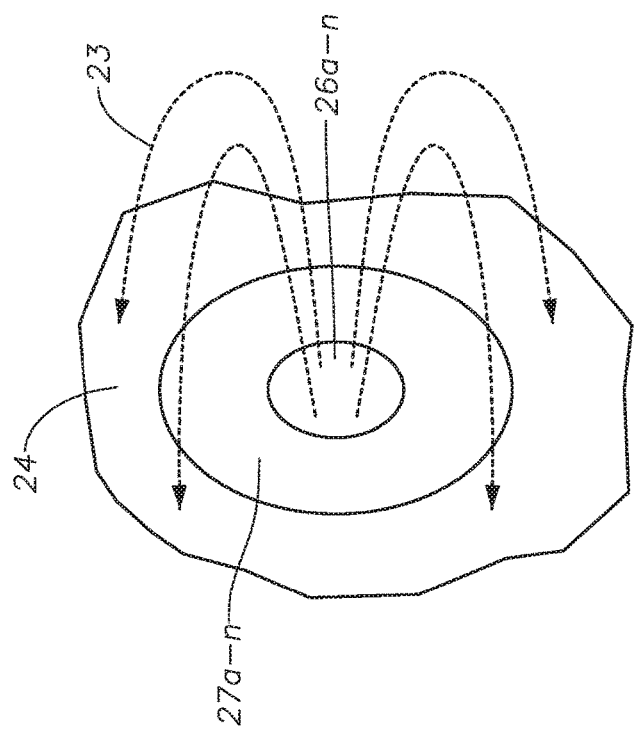
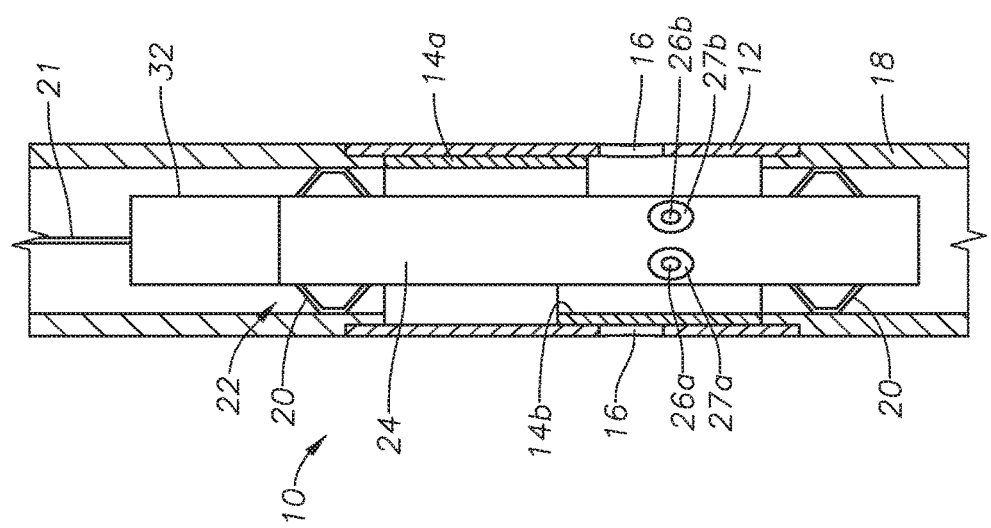
FIG. 4B
FIG. 4A

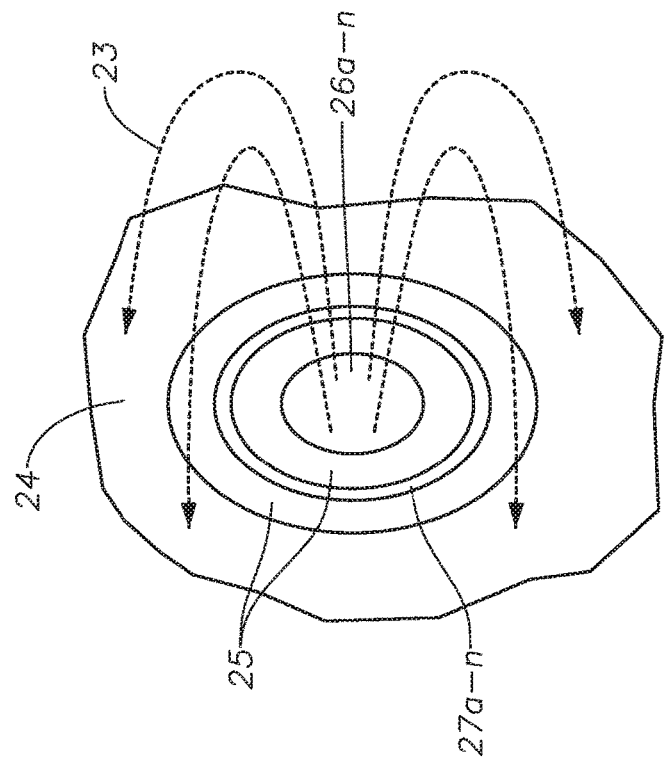
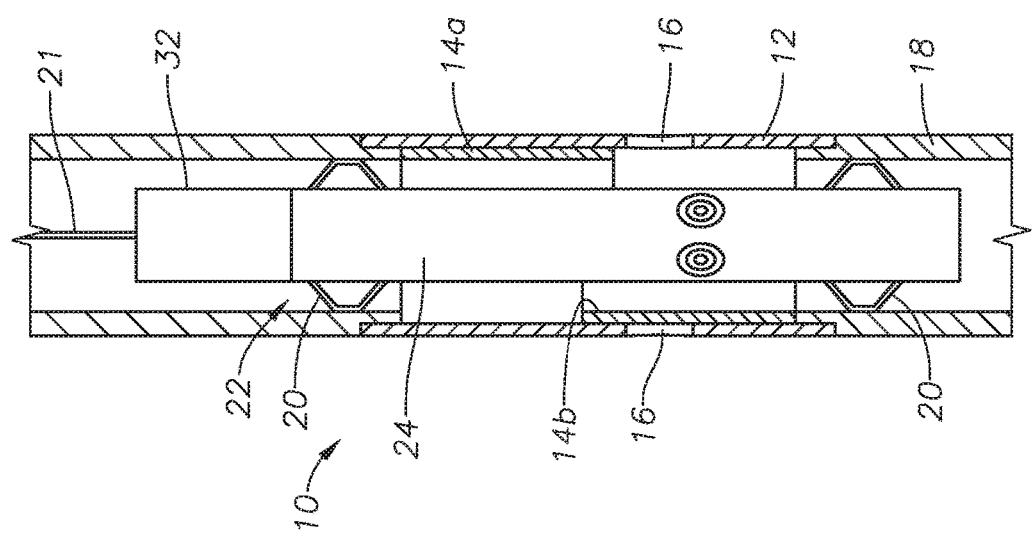

DETECTING SLIDING SLEEVE POSITION USING ELECTRODE-TYPE LOGGING

PRIORITY

The present application is a U.S. National Stage patent application of International Patent Application No. PCT/US2015/054493, filed on Oct. 7, 2015, the benefit of which is claimed and the disclosure of which is incorporated herein by reference in its entirety.

FIELD OF THE DISCLOSURE

Embodiments of present disclosure generally relates to the use of downhole sliding sleeves and, more particularly, to a method for detecting the operational position of a sliding sleeve using electrode-type logging.

BACKGROUND

Sliding sleeve valves are used downhole to control and regulate fluids flow through tubulars. Controlling fluid flow is important for various economic reasons. For example, sliding sleeves can be used to shut off zones producing too much water or depleting hydrocarbons produced by other zones. Typically, sliding sleeve valves consist of an external housing that is threaded to the tubing string. The housing has openings, known as flow ports, to allow fluid flow into or out of the tubing. Inside the housing, there is a sliding sleeve, known as the insert, whose axial position with respect to the housing is adjustable to open or close the flow ports.

Sliding sleeves are either mechanically or hydraulically actuated. Mechanical actuation involves using a lock that is run in the well on a wireline, coiled tubing or slickline tool. The lock engages onto a nipple in the sliding sleeve, and is then used to adjust the position of the sleeve. Hydraulic actuation involves using a hydraulic pump at the surface and more complicated actuation mechanisms.

In all cases, it is highly desirable to detect the operational condition of the sleeve (open/closed/partially open) after actuation. Historically, this was done by mechanically sensing the gap between the endpoint of the insert and the housing. Such mechanical detection involves using deployable arms and in contact measurements. It can, therefore, be unreliable and difficult to interpret in many cases.

Methods to detect the position of sliding sleeves using magnets and wireline or memory tools are known in the industry. These methods involve disposing magnets in pre-determined positions along the sliding sleeve housing and insert, and using a magnetic field detection tool, such as casing collar locator, to detect the relative position between these magnets, from which the operational condition of the sleeve is inferred. Another method employs the use of fiber optic based sensors to perform endpoint detection of sliding sleeves. The optical sensors are positioned in a recess in the valve housing, and are used to detect the stress imparted by the moving sleeve.

The drawback of all the above methods is that they only work for customized sliding sleeves equipped with magnets or optical sensors. This increases the cost and complexity of the sliding sleeves in new deployments, and makes the detection methods unusable for existing deployments having conventional sleeves.

BRIEF DESCRIPTION OF THE DRAWINGS

FIG. 4A illustrates a logging tool utilized to azimuthally determine the operational position of multiple sliding sleeves, according to certain illustrative embodiments of the present disclosure;

FIG. 4B illustrates an exploded view of the injection electrode assembly of FIG. 4A;

FIGS. 4C and 4D illustrate another logging tool and electrode assembly, respectively, utilized to azimuthally determine the position of multiple sliding sleeves, whereby the injected current is focused, according to alternate embodiments of the present disclosure.

DESCRIPTION OF ILLUSTRATIVE EMBODIMENTS

Figure 1A:
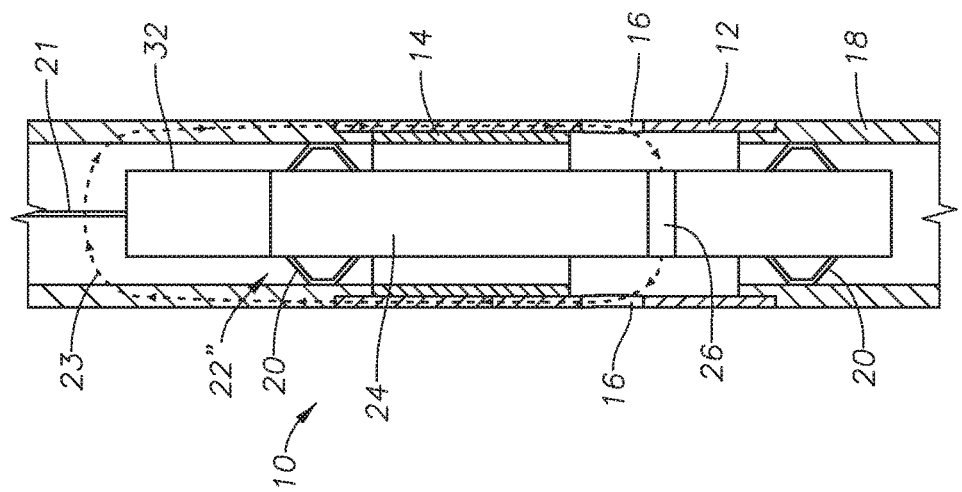
FIGS. 1A and 1B are sectional views of an electrode-type logging tool positioned within a sliding sleeve assembly, according to alternative illustrative embodiments of the present disclosure.

Illustrative embodiments and related methods of the present disclosure are described below as they might be employed in a method for detecting the operational position of a sliding sleeve using electrode-type logging. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative methods of the present disclosure are directed to detecting the operational position of a downhole sliding sleeve using an electrode-type logging tool. In an illustrative generalized method, the logging tool is deployed downhole inside wellbore tubing that includes a sliding sleeve assembly. Using electromagnetic ("EM") signals, the logging tool generates a log of the sliding sleeve in a non-actuated position, referred to as a "baseline log." The sleeve is then actuated into an open position, whereby the logging tool again generates a log of the sliding sleeve, referred to as a "response log." The baseline and response logs are then compared in order to determine the operational position of the sliding sleeve. Note, however, as described herein the baseline log may simply refer to a first log, while the response log refers to a subsequent log.

In a more specific embodiment and method, after the logging tool is deployed, the tool injects current between its excitation and return electrodes. The potential difference between two monitoring electrodes is then measured, whereby the voltage is proportional to the apparent resistivity seen by the logging tool. The apparent resistivity varies with the inner diameter on the tubing; sections with smaller inner diameters give rise to a lower apparent resistivity, and vice versa. This enables detection of the displacement of sliding sleeves along the assembly housing with respect to a baseline measurement. Therefore, as mentioned above, a baseline log is recorded before the sleeve is actuated. After actuation, another log is recorded. Comparison of the two logs enables the detection of the distance the sleeves moved after actuation. Given the dimensions of the sleeves and the maximum displacement they can move, the distance the sleeves moved after actuation relative to the baseline can be related to the operational condition of the sleeves (e.g., open, closed, partially open, etc.).

In the methods described herein, the baseline log may be generated in a variety of ways. For example, the baseline log can be made at the surface before deployment when the operational position of each sleeve is known. As such, the distance the sleeve moved after actuation relative to the baseline can be precisely related to the operational position of the sleeves. In other methods, the baseline log may be taken from a library of baseline logs compiled before deployment of the sleeve. In yet another method, the baseline log may be generated downhole before the sleeve is actuated.

FIG. 1A is a sectional view of an electrode-type logging tool positioned within a sliding sleeve assembly, according to certain illustrative embodiments of the present disclosure. Sliding sleeve assembly (e.g., valve) 10 consists of an external housing 12, a sliding sleeve 14, and flow ports 16. Housing 12 is threaded to a tubing string 18, such as, for example, a casing string, which is filled with tubing fluids. Sliding sleeve assembly 10 may contain other internal components, such as, for example, top and bottom internal collars (not shown) used to limit the stroke of the sliding sleeve. It is noted here that the examples described in the following sections are valid for any type of sliding sleeve which results in alteration of electromagnetic fields during opening and closing, i.e., any sleeve with moving parts. The descriptions given herein are merely illustrative in nature.

Still referring to FIG. 1A, an electrode-type logging tool 22 is suspended from wireline 21 and positioned inside sliding sleeve assembly 10 (shown in an open-position). Logging tool 22 includes a tool body 24, centralizers 20, injection electrode 26, return electrode 28, and two monitoring electrodes 30a and 30b. In one illustrative method, sliding sleeve assembly 10 is logged using galvanic principles; however, other methods (e.g., capacitive coupling) may be alternatively utilized. In FIG. 1A, however, logging tool 22 is a four-electrode galvanic tool. During operation, an EM signal (e.g., current 23) is injected from injection electrode 26, whereby it flows through the tubing fluids, walls of tubing 18 and sliding sleeve assembly 10, to thereby produce a response signal. The response signal is then received at return electrode 28. The potential difference across monitoring electrodes 30a,b is measured. Centralizers 20 are used to ensure constant standoff between logging tool 22 and the inner wall of tubing 18 and assembly 10 throughout the log. Constant standoff is important to avoid spurious variations in response signals from sections of the tubing having the same electrical properties.

In certain embodiments, monitoring electrodes 30a,b can be the same as injection electrodes 26. The tool body is comprised of non-conducting material, such as, for example, fiberglass. The voltage measurement across monitoring electrodes 30a,b is proportional to the whole-space equivalent resistivity (i.e., apparent resistivity) seen by logging tool 22. The apparent resistivity bears information about the electrical properties (inner diameter/wall thickness/conductivity) of the tubing (e.g., tubing 18, sliding sleeve assembly 10, etc.). The smaller the inner diameter of the tubing, the lower the apparent resistivity, and vice versa. It is noted here that although apparent resistivity is used as the main quantity of interest, other directly or inversely proportional quantities can be used as well: such as, for example, mutual impedance (ratio of voltage at the measure electrodes to current injected) and mutual conductance (inverse of mutual impedance).

An intervention tool 32 is positioned above logging tool 22. Intervention tool 32 is utilized to actuate sliding sleeve 14 between open and closed positions, as will be described in more detail below. Intervention tool 32 is also comprised of non-conducting material on the outside between the electrodes to avoid shorting of current, and may include a variety of actuation mechanisms, such as, for example, "catching" mechanisms actuated with shear or release forces, "collet" mechanisms that are actuated based on applied pressure which in combination with tool weight exceeds the threshold for releasing.

Figure 1B:
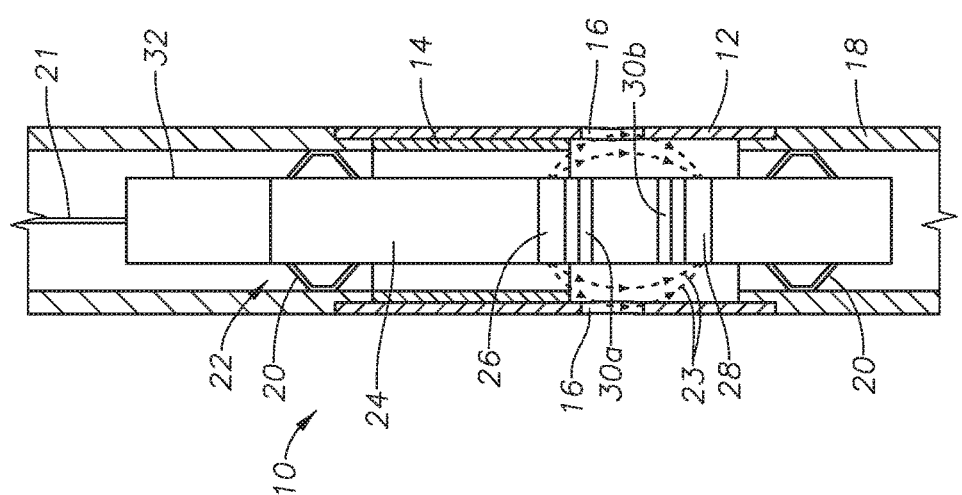

FIG. 1B illustrates another electrode-type logging tool, according to alternative embodiments of the present disclosure. Logging tool 22" is similar to logging tool 22; therefore like components are identified as shown in FIG. 1A. However, logging tool 22" utilizes only one injection electrode 26. During operation, the EM signal (e.g., current 23) is injected between injection electrode 26 on tool body 24 and returns to wireline armor 21. Voltage can be measured between injection electrode 26 and armor 21, or alternatively, a dedicated monitoring electrode (not shown) can be used.

Figure 1C:
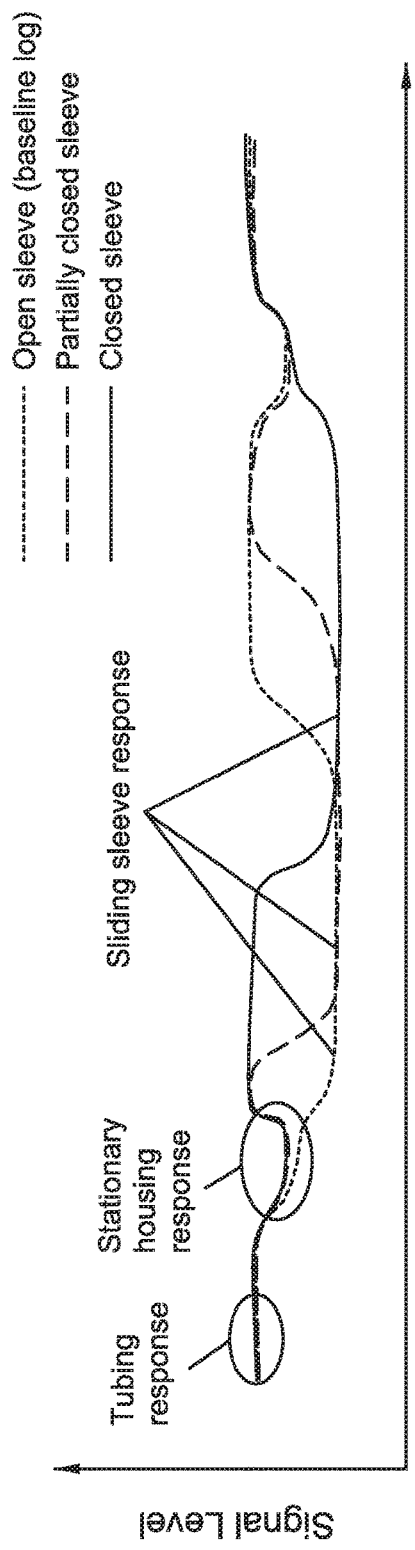
FIG. 1C plots three logs, by signal level vs. depth, that correspond to different operational positions of a sliding sleeve.

During operation of logging tools 22,22", as the tool is logged past sliding sleeve assembly 10, a change in the recorded response (i.e., log) is witnessed, reflecting the change in diameter and wall thickness of sliding sleeve assembly 10 from that of the tubing 18. FIG. 1C plots three log responses that correspond to different operational positions of the sleeve, and is useful to illustrate this feature. The three logs include an open sleeve, partially closed sleeve, and closed sleeve logs, each plotted by response signal level versus depth. Note that either log may serve as the baseline log, with the subsequent log acting as the response log. In the example of FIG. 1C, the open sleeve log serves as the baseline log.

In FIG. 1C, part of the sleeve response is due to stationary features in sleeve assembly 10, such as housing 12, flow ports 16 and other stationary internal components. The position of these stationary components is independent of the position of sliding sleeve 14. Another portion of the sleeve response is due to sliding sleeve 14. The sliding sleeve portion of the response varies with the position of sleeve 14. In general, for any sleeve position, there exists a unique signal pattern (signature) which is the combination of signals due to stationary and movable features in sliding sleeve assembly 10.

Therefore, in order to detect the operational condition of sliding sleeve 14, a baseline log is first recorded before sleeve 14 is actuated (e.g., open sleeve log of FIG. 1C). After actuation, a second log (i.e., response log) is recorded and compared with the baseline log (in FIG. 1C, the response log may be the partially closed or closed sleeve logs). The distance sleeve 14 has travelled upon actuation can be detected by comparing the two logs. In certain illustrative methods, the amplitude of the two logs is normalized to eliminate any drifts in the signal level from one measurement to the other. For this, a flat response of the tubing can be utilized.

In order to extract the sleeve displacement from the comparison of the baseline and response logs, both logs have to be well aligned (with respect to the true depth). In certain methods, alignment may be accomplished by aligning parts of the sleeve assembly response signal that are due to stationary features. In FIG. 1C, for example, this may be the portion of the response log representing the stationary housing 12 ("stationary housing response"). This is an accurate method by which to align since it relies on features in sliding sleeve assembly 10 in close vicinity to sliding sleeve 14, and hence it is less vulnerable to depth drifts in the measured logs. When logging a sleeve assembly having multiple sleeves, the alignment process can be done for each sleeve independently if needed.

In an alternate method, the baseline and response logs may be aligned by using features in the hosting tubing 18, such as collars, for example, as shown in FIG. 1C. The closest collar to each sleeve 14 can be used to locally align the logs at the respective sleeves. This method works accurately as long as the collars are within sufficiently small distances (e.g., ~30 ft. or less) from sleeves 14.

In yet another method, the baseline and response logs may be aligned using features in the wellbore formation logged by tool 22, which has the capability to look behind the tubing and the casing, such as a gamma tool, for example. If a gamma tool is included in the logging tool string, gamma logs in the vicinity of each sleeve assembly 10 can be used to locally align the galvanic logs at the respective sleeves 14. In such methods, the EM signal may be injected at a frequency range of, for example, DC-1 kHz based upon galvanic principles. However, in other embodiments, the EM signal may be injected at a frequency range of above 1 kHz using capacitive coupling principles. These and other modifications will be apparent to those ordinarily skilled in the art having the benefit of this disclosure.

Figure 1D:
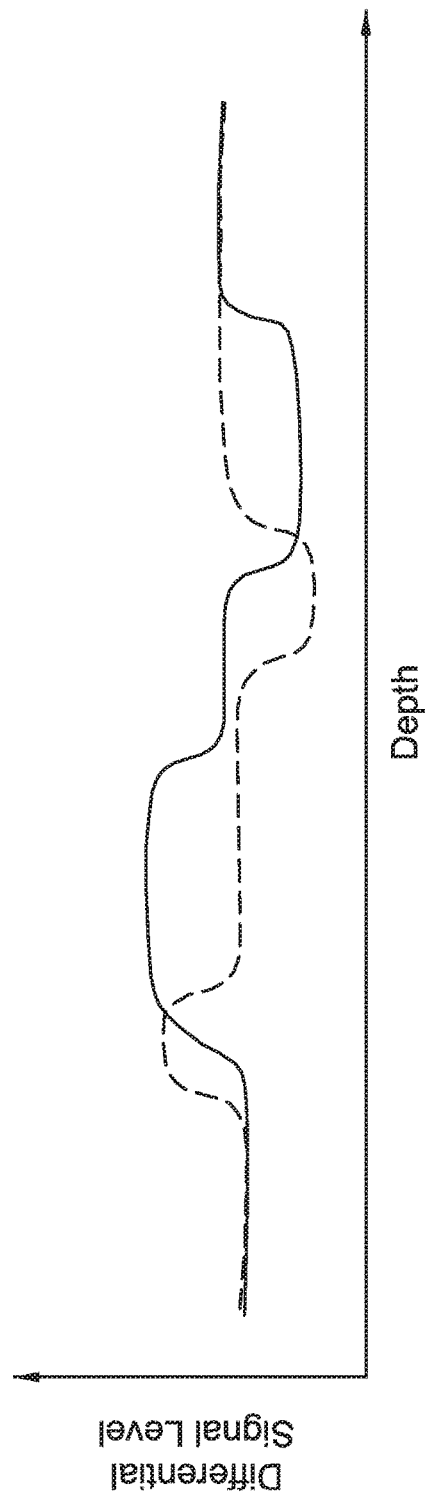
FIG. 1D illustrates the differential logs with respect to the baseline log of FIG. 1C.

Once the baseline and response logs are aligned, they are compared to detect the displacement of sliding sleeve 14. In certain illustrative methods, the comparison may be performed by subtracting the baseline log from the response log. In FIG. 1D, two differential logs with respect to the baseline log of FIG. 1C is illustrated. The dashed curve of FIG. 1D corresponds to the difference between the partially closed sleeve and the open sleeve, while the solid curve corresponds to the difference between the closed sleeve and the open sleeve. Although two differential logs are illustrated, only one differential log is needed to determine the operational position between a given baseline and response log.

Given the dimensions of the sleeves and the maximum displacement they are allowed to have, the distance the sleeves move after actuation relative to the baseline can be related to the operational condition of the sleeves (e.g., open/closed/partially open). If the distance travelled by the sleeve is equal to the maximum displacement the sleeve can move, then the operation condition of the valve can be precisely determined as either fully open or fully closed. Otherwise, if the distance travelled by the sleeve is less than the maximum displacement, the operational condition of the valve cannot be uniquely determined unless the baseline condition is known. In such case, either one or both of the open and closed logs may not correspond to an actual fully open or closed condition respectively. If the baseline is known or assumed, both logs before and after the sleeve movement can be correlated in depth with respect to each other using one of the available depth correlation methods, distance traveled by the sleeve can be estimated from the thickness of the features (such as the two humps in the dashed curve in FIG. 1D) difference signal (thicker difference indicates larger distance), then the operational position of the sleeve can be determined.

Therefore, in certain illustrative methods of the present disclosure, the initial operational position of the sliding sleeves can be determined with high degree of certainty by actuating the sleeves several times to either fully open or fully closed position (for example, in mechanically actuated sleeves, the lock is engaged and hammered several times to make sure that the sleeve is open or closed). After this is done, the sliding sleeve assembly is logged to establish the baseline log. Note that, in certain methods, this baseline log can be performed at the surface before the sleeve assembly is deployed, or this log can be performed downhole after the sleeve assembly has been deployed.

Figure 2:
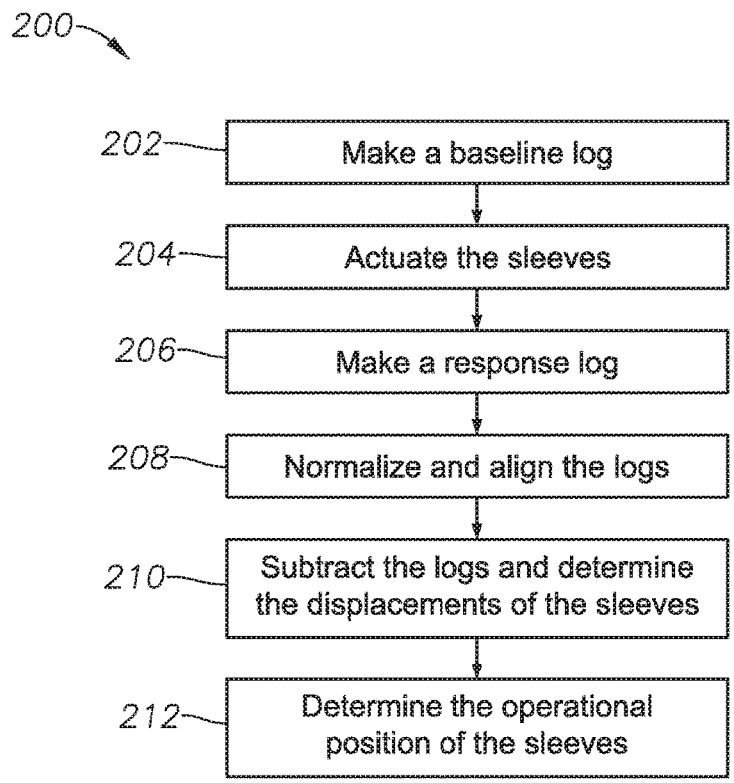
FIG. 2 is a flowchart of a method 200 for detecting the operational condition of a sleeve using two in-situ logs, according to certain illustrative methods of the present disclosure.

FIG. 2 is a flowchart of a method 200 for detecting the operational condition of the sleeves using two in-situ logs, according to certain illustrative methods of the present disclosure. After the logging tool has been deployed downhole, method 200 begins with estimating the initial operational position of the sliding sleeve (e.g., fully closed or open). At block 202, the logging tool logs the sliding sleeve assembly to generate the baseline log. At block 204, the sleeve is then actuated to another operational position using, for example, intervention tool 32. At block 206, the logging tool then logs the sleeve assembly a second time to generate the response log. At block 208, the baseline and response logs are normalized and aligned. At block 210, the baseline and response logs are subtracted, whereby the displacement of the sleeve is determined. At block 212, the operational position of the sleeve is then determined.

Figure 3:
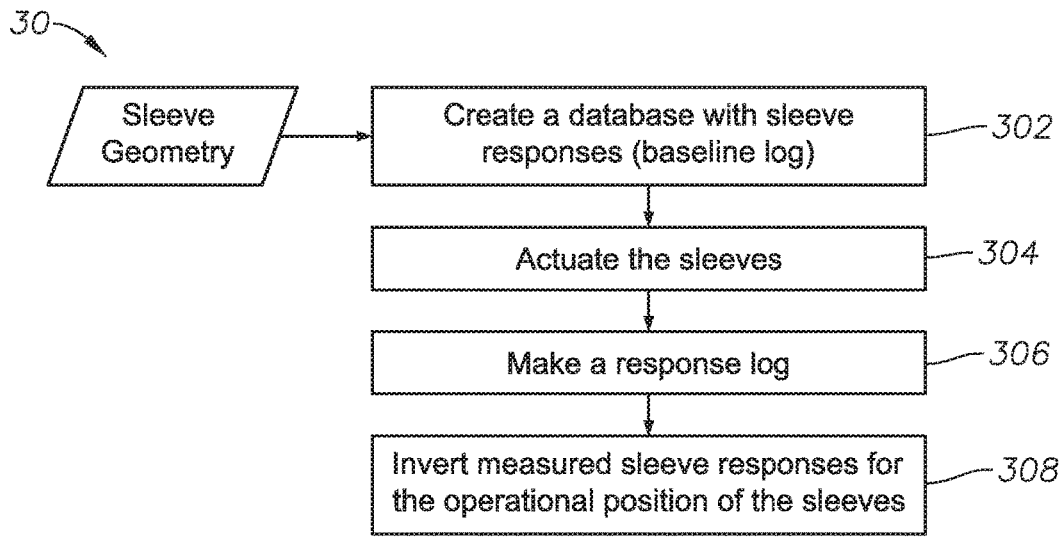
FIG. 3 is a flow chart of a method 300 for detecting the operational condition of a sleeve using a baseline log library and an in-situ response log, according to certain illustrative methods of the present disclosure.

As mentioned before, the uncertainty in the operational position of the baseline log (when logged in-situ) can cause ambiguity in detecting the operational position of the sleeve when using the method of FIG. 2. Accordingly, FIG. 3 is a flow chart of method 300 in which a baseline log library is utilized. In order to eliminate the ambiguity with an in-situ baseline log, pre-deployment surface characterization of the sleeve response, including sleeve geometry, can be made and stored in a baseline log library. According to this alternative method, a database (i.e., baseline log library) is created which includes the responses of the sleeve at all operational positions (block 302). After deployment, the sleeve is actuated at block 304. To detect the operational position of deployed sleeves, only one response log is made (no in-situ baseline log is needed in this case) at block 306. At block 308, the response of each sleeve in the log is inverted for the operational position of that sleeve. Inversion may be performed in a variety of ways, including, for example, performing pattern recognition techniques between the measured response and those stored in the library. Note that different libraries with be required for different types of sleeves. Therefore, in this method, the type of sleeve used downhole needs to be known a priori to in order to apply the correct database for inversion.

The methods described herein may be performed using processing circuitry located at the surface, along the downhole assembly, or forming part of the logging tool itself. Although not shown, the processing circuitry may include at least one processor, a non-transitory, computer-readable storage (also referred to herein as a "computer-program product"), transceiver/network communication module, optional I/O devices, and an optional display (e.g., user interface), all interconnected via a system bus. Software instructions executable by the processor for implementing the illustrative methods described herein, may be stored in the local storage medium or some other computer-readable medium.

Moreover, those ordinarily skilled in the art will appreciate that embodiments of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. Embodiments of the disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Furthermore, note that a variety of logging tools may be utilized in the present disclosure. Galvanic tools, for example, operate at low frequencies from DC up to 1 kHz, and any type of galvanic tool (e.g., dual laterolog (DLL), array laterolog (ALT), etc.) can be used for sliding sleeve detection. If operation in high resistivity fluids (oil-based tubing fluids) is required, high frequencies can be used to short the resistive fluid, which typically means going above 1 MHz. Additionally, sliding sleeves are typically in the order of 3-5 ft. Therefore, in certain methods, to detect the sleeve position accurately, the tool is logged in steps of 0.5 ft. or less.

In another embodiment, instead of using a wireline tool, a slickline tool can be used. In this case, the tool is equipped with batteries for power and memory for storing the logs, also referred to as a "memory tool." In yet other embodiments, the logging tool may be utilized in a drilling or other downhole assembly.

FIG. 4A illustrates a logging tool utilized to azimuthally determine the operational position of multiple or azimuthally varying sliding sleeves (open sleeve 14a and closed sleeve 14b), according to certain illustrative embodiments of the present disclosure. In certain sliding sleeve assemblies, multiple sleeves exist within the same assembly to independently control flow from different ports, as shown in FIG. 4A. In certain other sliding sleeve assemblies, sleeves may vary azimuthally in shape. Azimuthal detection of the operational condition of sleeves can be achieved by loading logging tool 22 with multiple azimuthally distributed electrodes 26a-26n. Logging tool 22 of FIG. 4A is similar to previously described logging tools, therefore like elements are identified with the same numerals. However, in this embodiment, multiple injection electrodes 26a-26n are utilized.

Electrodes 26a-n can be contained within body 24 as shown, or can be loaded in pads that are pressed against the inner wall of tubing 18 using deployable arms (as in borehole galvanic imagers). In this example, tool body 24 serves as the return electrode. FIG. 4B illustrates an exploded view of the injection electrode assembly. Here, the injection electrode assembly consists of injection electrode 26a-n separated by insulation (i.e., guard electrode 27a-n) from the return electrode (tool body 24). The potential of each injection electrode 26a-n with respect to tool body 24 is proportional to the apparent resistance seen by that electrode, which varies with the offset between the electrode and the tubing inner wall. Although not illustrated as such, current 23 does interact with the body of tubing 18 and sleeve assembly 10 as previously described.

FIGS. 4C and 4D illustrate another logging tool and electrode assembly, respectively, whereby the injected current is focused, according to an alternate embodiment of the present disclosure. In FIGS. 4C and 4D, each electrode assembly consists of an injection electrode 26a-n, a guard electrode 27a-n, and a return electrode (tool body 24). These electrodes are separated by insulation 25. Current 23 in guard electrode 27a-n is adjusted such that the potential of guard electrode 27a-n is equal to that of injection electrode 26a-n. This ensures that injected current 23 is perpendicular to tool body 24, i.e., current 23 is focused along the radial direction at the electrode azimuth.

Utilizing the logging tools described in FIGS. 4A-4D, combined measurements by all electrodes provide a 2-D (axial and azimuthal) image of the inside of tubing 18 (including sleeve assembly 10). This image reflects any variation in the inner diameter or thickness of the tubing 18/assembly 10, from which the condition of an azimuthally varying sleeve or multiple sliding sleeves 14 (at different azimuthal and/or axial locations) can be detected using the same illustrative methods described herein.

Figure 5:
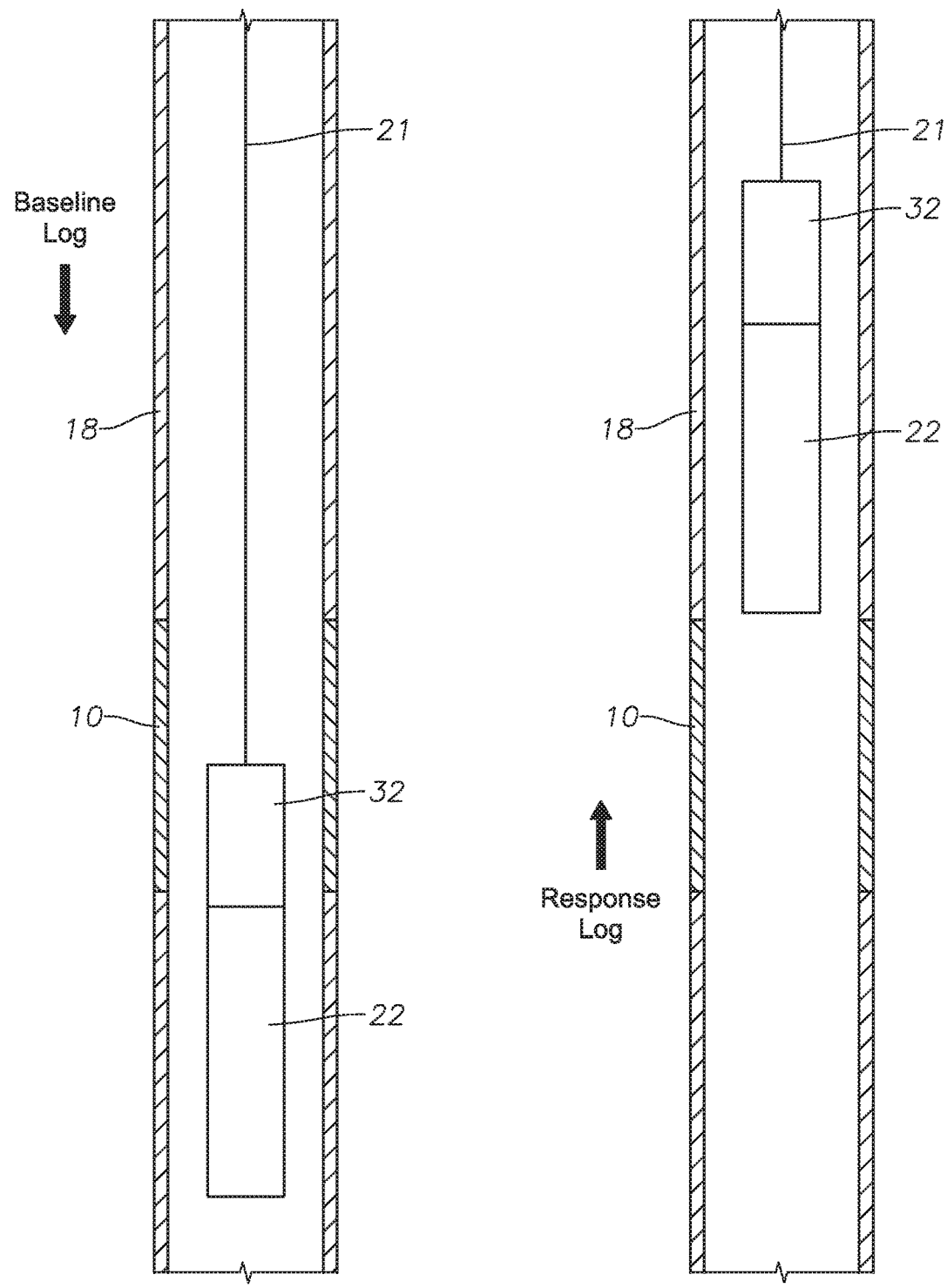
FIG. 5 illustrates a logging operation performed according to certain illustrative methods of the present disclosure.

FIG. 5 illustrates a logging operation performed according to certain illustrative methods of the present disclosure. Here, sliding sleeve assembly 10 has been deployed along tubing 18 as previously described. Logging tool 22 and intervention tool 32 have also been deployed downhole. In this example, a baseline log is first generated by logging tool 22 downhole past assembly 10. After logging tool 22 passes assembly 10, intervention tool 32 is then used to actuate the operational position of the sleeve (not shown) of assembly 10. Thereafter, in an uphole direction, logging tool 22 is logged up past assembly 10 in order to generate the response log. Then, as previously described, the logs are compared whereby the operational position of the sleeve can be determined.

Although not shown, in those embodiments whereby a baseline log library is utilized, the logging tool may only be logged one past sliding sleeve assembly 10 in order to generate the response log. Moreover, the method described in relation to FIG. 5 is illustrative in nature, as other methods may be utilized.

Accordingly, the illustrative embodiments and methods described herein provide a variety of advantages. First, for example, the disclosed methods do not require any customized sleeves or any modifications to existing sleeves. Second, the disclosed methods can work with any logging tool (e.g., wireline and slickline tools), i.e., does not require customized logging tools. Third, logging imagers can be used to detect the operational condition of different azimuthally distributed sleeves. Fourth, the disclosed methods obviate any need for mechanical sensing of the gap between the endpoint of the insert and the housing, as such conventional mechanical sensing can be unreliable and difficult to interpret. Fifth, the displacement of the sleeves can be detected using simple processing; no sophisticated inversion is needed.

Embodiments described herein further relate to any one or more of the following paragraphs:

1. A method for detecting a position of a downhole sliding sleeve, the method comprising: injecting an electromagnetic ("EM") signal into a wellbore, wherein the EM signal interacts with a sliding sleeve to produce a response signal;

measuring the response signal; and determining an operational position of the sliding sleeve using the response signal.

2. A method as defined in paragraph 1, wherein determining the operational position comprises: using one or more response signals to generate a response log of the sliding sleeve; comparing the response log to a baseline log library, the baseline log library containing logs comprising response signals of the sliding sleeve at a plurality of operational positions; and determining the operational position of the sliding sleeve based upon the comparison.

3. A method as defined in paragraphs 2 or 3, wherein determining the operational position comprises: using one or more response signals to generate a response log of the sliding sleeve; comparing the response log with a baseline log of the sliding sleeve; and determining the operational position of the sliding sleeve based upon the comparison.

4. A method as defined in any of paragraphs 1-3, wherein the baseline log is generated at a surface location.

5. A method as defined in any of paragraphs 1-4, wherein the baseline log is generated within the wellbore.

6. A method as defined in any of paragraphs 1-5, wherein: the baseline log is generated before the sliding sleeve is actuated; and the response log is generated after the sliding sleeve is actuated.

7. A method as defined in any of paragraphs 1-6, wherein comparing the response log with the baseline log comprises using a pattern recognition technique to perform the comparison.

8. A method as defined in any of paragraphs 1-7, further comprising aligning the response log and baseline log with respect to true depth.

9. A method as defined in any of paragraphs 1-8, wherein: the sliding sleeve forms part of a sliding sleeve assembly; and the alignment is achieved by aligning portions of the response log and baseline log representing stationary features of the sliding sleeve assembly.

10. A method as defined in any of paragraphs 1-9, wherein the alignment is achieved by aligning portions of the response log and baseline log representing features of a tubing along which the sliding sleeve is positioned.

11. A method as defined in any of paragraphs 1-10, wherein the feature is a collar.

12. A method as defined in any of paragraphs 1-11, wherein the alignment is achieved by aligning portions of the response log and baseline log representing a wellbore formation.

13. A method as defined in any of paragraphs 1-12, wherein the EM signal is injected at a frequency range of DC-1 kHz based upon galvanic principles.

14. A method as defined in any of paragraphs 1-13, wherein the EM signal is injected at a frequency range of above 1 kHz based upon capacitive coupling principles.

15. A method as defined in any of paragraphs 1-14, wherein injecting the EM signal is achieved using an injection electrode of a logging tool, the response signal being returned to the logging tool using a return electrode; and measuring the response signal is achieved by measuring voltages of the injection and return electrodes.

16. A method as defined in any of paragraphs 1-15, wherein: injecting the EM signal is achieved using an injection electrode of a logging tool, the response signal being returned to the logging tool using a wireline; and measuring the response signal is achieved by measuring voltages of the injection electrode and the wireline.

17. A method as defined in any of paragraphs 1-16, wherein: injecting the EM signal is achieved using an injecting electrode of a logging tool, the response signal being returned to the logging tool using a return electrode; and measuring the response signal is achieved by measuring voltages of a first and second monitoring electrode of the logging tool.

18. A method as defined in any of paragraphs 1-17, wherein: the baseline log is generated by moving a logging tool downhole past the sliding sleeve, the logging tool comprising an intervention tool to actuate the sleeve after the baseline log is generated; and the response log is generated by moving the logging tool uphole past the actuated sliding sleeve.

19. A method as defined in any of paragraphs 1-18, wherein determining the operational position comprises azimuthally determining the operational position the sliding sleeve.

20. A method as defined in any of paragraphs 1-19, wherein a logging tool comprising multiple azimuthally distributed electrodes is utilized to determine the operational position of the sliding sleeve.

21. A method as defined in any of paragraphs 1-20, further comprising generating an image of downhole tubing based upon the azimuthally determined operational position of the sliding sleeve.

22. A logging system, comprising a logging tool having one or more electrodes thereon; and processing circuitry communicably coupled to the logging tool to perform a method comprising: injecting an electromagnetic ("EM") signal into a wellbore using the electrodes, wherein the EM signal interacts with a sliding sleeve to produce a response signal; measuring the response signal; and determining an operational position of the sliding sleeve using the response signal.

23. A system as defined in paragraph 22, wherein determining the operational position comprises using one or more response signals to generate a response log of the sliding sleeve; comparing the response log to a baseline log library, the baseline log library containing logs comprising response signals of the sliding sleeve at a plurality of operational positions; and determining the operational position of the sliding sleeve based upon the comparison.

24. A system as defined in paragraphs 22 or 23, wherein determining the operational position comprises: using one or more response signals to generate a response log of the sliding sleeve; comparing the response log with a baseline log of the sliding sleeve; and determining the operational position of the sliding sleeve based upon the comparison.

25. A system as defined in any of paragraphs 22-24, wherein the baseline log is generated at a surface location.

26. A system as defined in any of paragraphs 22-25, wherein the baseline log is generated within the wellbore.

27. A system as defined in any of paragraphs 22-26, wherein: the baseline log is generated before the sliding sleeve is actuated; and the response log is generated after the sliding sleeve is actuated.

28. A system as defined in any of paragraphs 22-27, wherein comparing the response log with the baseline log comprises using a pattern recognition technique to perform the comparison.

29. A system as defined in any of paragraphs 22-28, further comprising aligning the response log and baseline log with respect to true depth.

30. A system as defined in any of paragraphs 22-29, wherein the sliding sleeve forms part of a sliding sleeve assembly; and the alignment is achieved by aligning portions of the response log and baseline log representing stationary features of the sliding sleeve assembly.

31. A system as defined in any of paragraphs 22-30, wherein the alignment is achieved by aligning portions of the response log and baseline log representing features of a tubing along which the sliding sleeve is positioned.

32. A system as defined in any of paragraphs 22-31, wherein the feature is a collar.

33. A system as defined in any of paragraphs 22-32, wherein the alignment is achieved by aligning portions of the response log and baseline log representing a wellbore formation.

34. A system as defined in any of paragraphs 22-33, wherein the EM signal is injected at a frequency range of DC-1 kHz based upon galvanic principles.

35. A system as defined in any of paragraphs 22-34, wherein the EM signal is injected at a frequency range of above 1 kHz based upon capacitive coupling principles.

36. A system as defined in any of paragraphs 22-35, wherein: injecting the EM signal is achieved using an injection electrode of the logging tool, the response signal being returned to the logging tool using a return electrode; and measuring the response signal is achieved by measuring voltages of the injection and return electrodes.

37. A system as defined in any of paragraphs 22-37, wherein injecting the EM signal is achieved using an injection electrode of the logging tool, the response signal being returned to the logging tool using a wireline; and measuring the response signal is achieved by measuring voltages of the injection electrode and the wireline.

38. A system as defined in any of paragraphs 22-37, wherein: injecting the EM signal is achieved using an injecting electrode of the logging tool, the response signal being returned to the logging tool using a return electrode; and measuring the response signal is achieved by measuring voltages of a first and second monitoring electrode of the logging tool.

39. A system as defined in any of paragraphs 22-38, wherein the baseline log is generated by moving the logging tool downhole past the sliding sleeve, the system comprising an intervention tool to actuate the sleeve after the baseline log is generated; and the response log is generated by moving the logging tool uphole past the actuated sliding sleeve.

40. A system as defined in any of paragraphs 22-39, wherein determining the operational position comprises azimuthally determining the operational position the sliding sleeve.

41. A system as defined in any of paragraphs 22-40, wherein the logging tool comprising multiple azimuthally distributed electrodes is utilized to determine the operational position of the sliding sleeve.

42. A system as defined in any of paragraphs 22-41, further comprising generating an image of downhole tubing based upon the azimuthally determined operational position of the sliding sleeve.

43. A system as defined in any of paragraphs 22-42, wherein the logging tool forms part of a wireline, slickline or drilling assembly.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for detecting a position of a downhole sliding sleeve, the method comprising:
   deploying a logging tool inside a wellbore tubular having a sliding sleeve thereon, the logging tool comprising an injection electrode;
   injecting an electromagnetic ("EM") signal into a wellbore using the injection electrode, wherein the EM signal produces current that flows through the sliding sleeve to produce a response signal;
   measuring the response signal; and
   determining an operational position of the sliding sleeve using the response signal.

2. A method as defined in claim 1, wherein determining the operational position comprises:
   using one or more response signals to generate a response log of the sliding sleeve;
   comparing the response log to a baseline log library, the baseline log library containing logs comprising response signals of the sliding sleeve at a plurality of operational positions; and
   determining the operational position of the sliding sleeve based upon the comparison.

3. A method as defined in claim 1, wherein:
   the response signal is returned to the logging tool using a return electrode; and
   measuring the response signal is achieved by measuring voltages of the injection and return electrodes.

4. A method as defined in claim 1, wherein:
   the response signal is returned to the logging tool using a wireline; and
   measuring the response signal is achieved by measuring voltages of the injection electrode and the wireline.

5. A method as defined in claim 1, wherein:
   the response signal is returned to the logging tool using a return electrode; and
   measuring the response signal is achieved by measuring voltages of a first and second monitoring electrode of the logging tool.

6. A method as defined in claim 1, further comprising generating an image of downhole tubing based upon an azimuthally determined operational position of the sliding sleeve.

7. A method as defined in claim 1, wherein determining the operational position comprises:
   using one or more response signals to generate a response log of the sliding sleeve;
   comparing the response log with a baseline log of the sliding sleeve; and
   determining the operational position of the sliding sleeve based upon the comparison.

8. A method as defined in claim 7, wherein:
   the baseline log is generated before the sliding sleeve is actuated; and
   the response log is generated after the sliding sleeve is actuated.

9. A method as defined in claim 7, wherein:
   the baseline log is generated by moving a logging tool downhole past the sliding sleeve, the logging tool comprising an intervention tool to actuate the sleeve after the baseline log is generated; and
   the response log is generated by moving the logging tool uphole past the actuated sliding sleeve.

10. A method as defined in claim 7, further comprising aligning the response log and baseline log with respect to true depth.

11. A method as defined in claim 10, wherein:
the sliding sleeve forms part of a sliding sleeve assembly; and
the alignment is achieved by aligning portions of the response log and baseline log representing stationary features of the sliding sleeve assembly.

12. A method as defined in claim 10, wherein:
the alignment is achieved by aligning portions of the response log and baseline log representing features of a tubing along which the sliding sleeve is positioned; or
the alignment is achieved by aligning portions of the response log and baseline log representing a wellbore formation.

13. A logging system, comprising:
a logging tool having one or more electrodes thereon; and
processing circuitry communicably coupled to the logging tool to perform a method comprising:
deploying the logging tool inside a wellbore tubular having a sliding sleeve thereon;
injecting an electromagnetic ("EM") signal into the wellbore using the electrodes, wherein the EM signal a produces current that flows through the sliding sleeve to produce a response signal;
measuring the response signal; and
determining an operational position of the sliding sleeve using the response signal.

14. A system as defined in claim 13, wherein determining the operational position comprises:
using one or more response signals to generate a response log of the sliding sleeve;
comparing the response log to a baseline log library, the baseline log library containing logs comprising response signals of the sliding sleeve at a plurality of operational positions; and
determining the operational position of the sliding sleeve based upon the comparison.

15. A system as defined in claim 13, wherein determining the operational position comprises:
using one or more response signals to generate a response log of the sliding sleeve;
comparing the response log with a baseline log of the sliding sleeve; and
determining the operational position of the sliding sleeve based upon the comparison.

16. A system as defined in claim 13, wherein:
injecting the EM signal is achieved using an injection electrode of the logging tool, the response signal being returned to the logging tool using a return electrode; and
measuring the response signal is achieved by measuring voltages of the injection and return electrodes.

17. A system as defined in claim 13, wherein:
injecting the EM signal is achieved using an injection electrode of the logging tool, the response signal being returned to the logging tool using a wireline; and
measuring the response signal is achieved by measuring voltages of the injection electrode and the wireline.

18. A system as defined in claim 13, wherein:
injecting the EM signal is achieved using an injecting electrode of the logging tool, the response signal being returned to the logging tool using a return electrode; and
measuring the response signal is achieved by measuring voltages of a first and second monitoring electrode of the logging tool.

19. A system as defined in claim 13, further comprising generating an image of downhole tubing based upon an azimuthally determined operational position of the sliding sleeve.

20. A system as defined in claim 15, wherein:
the baseline log is generated before the sliding sleeve is actuated; and
the response log is generated after the sliding sleeve is actuated.

21. A system as defined in claim 15, further comprising aligning the response log and baseline log with respect to true depth.

22. A system as defined in claim 21, wherein:
the sliding sleeve forms part of a sliding sleeve assembly; and
the alignment is achieved by aligning portions of the response log and baseline log representing stationary features of the sliding sleeve assembly.

23. A system as defined in claim 21, wherein:
the alignment is achieved by aligning portions of the response log and baseline log representing features of a tubing along which the sliding sleeve is positioned; or
the alignment is achieved by aligning portions of the response log and baseline log representing a wellbore formation.

24. A system as defined in claim 15, wherein:
the baseline log is generated by moving the logging tool downhole past the sliding sleeve, the system comprising an intervention tool to actuate the sleeve after the baseline log is generated; and
the response log is generated by moving the logging tool uphole past the actuated sliding sleeve.

* * * * *